United States Patent
Lim et al.

(12)

(10) Patent No.: US 6,604,238 B1
(45) Date of Patent: Aug. 5, 2003

(54) METHOD AND SYSTEM FOR INSTALLING SOFTWARE

(75) Inventors: Chee Koon Lim, Singapore (SG); Choon Yin Teo, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/539,054

(22) Filed: Mar. 30, 2000

(30) Foreign Application Priority Data

Jul. 26, 1999 (SG) .............................................. 9903601

(51) Int. Cl.[7] .............................................. G06F 9/445
(52) U.S. Cl. ......................................... 717/177; 705/26
(58) Field of Search ................................ 717/168–178; 705/26

(56) References Cited

U.S. PATENT DOCUMENTS

| | | | | | |
|---|---|---|---|---|---|
| 5,950,010 | A | * | 9/1999 | Hesse et al. ................. | 717/178 |
| 6,067,582 | A | * | 5/2000 | Smith et al. ................. | 717/176 |
| 6,247,128 | B1 | * | 6/2001 | Fisher et al. ................. | 713/100 |
| 6,256,773 | B1 | * | 7/2001 | Bowman-Amuah ......... | 717/168 |
| 6,279,154 | B1 | * | 8/2001 | Davis .......................... | 717/178 |
| 6,301,707 | B1 | * | 10/2001 | Carroll et al. ............... | 717/178 |
| 6,385,766 | B1 | * | 5/2002 | Doran, Jr. et al. .......... | 717/178 |

\* cited by examiner

*Primary Examiner*—Gregory Morse
*Assistant Examiner*—Chuck Kendall

(57) ABSTRACT

The present invention is a system and method for facilitating the installation of third party software programs according to the user's preferred configuration. While it permits the normal user inputs such as keying in of personal information and license keys, it masks the actual installation process and reactivates automatically the next installation once previous one is completed. Not only does it allow the user to configure the system of his choice, but it permits the manufacturer to customize the configuration effectively on a mass production and product to order system.

12 Claims, 3 Drawing Sheets

```
[setup]
name=QUICKEN98
command=E:\3RDPARTY\QUICKEN\SETUP.EXE
process=_INS0432._MP
```

*FIG.3A*

```
[1]
name=QUICKEN98
command=E:\3RDPARTY\QUICKEN\SETUP.EXE
process=_INS0432._MP

[Setup]
count=1
start=0
end=0
status=idle
```

*FIG.3B*

```
[1]
name=QUICKEN98
command=E:\3RDPARTY\QUICKEN\SETUP.EXE
process=_INS0432._MP

[Setup]
count=1
start=1
end=1
status=idle
```

*FIG.3C*

METHOD AND SYSTEM FOR INSTALLING SOFTWARE

FIELD OF THE INVENTION

The present invention relates to a system and method for installing third party software programs on a personal computer. In particular, the present invention pertains to an intelligent and non obtrusive system and method for installing third party software on a computer where the chores of installing and rebooting the third party software are minimized.

BACKGROUND OF THE INVENTION

Suppliers of hardware and software have make their products increasingly user friendly and hassle free for businesses and consumers alike to embrace the computer revolution. In contrast, the process of installing software whether they be operating systems, applications or utilities, is getting lengthy and complicated. By installation, the present invention refers to the first time process a user go through to configure and initiate a new software on a computer. The reasons for lengthy installation of software are many fold: (1) software are getting larger and more complicated to meet the end users' requirements; (2) software have to work with an increasing choice of peripherals and devices and also other programs; and (3) security concerns mandate the architecture of software be multi-layer and the attendant compatibility tests which are required.

It is not that unusually for a user of a new computer system to spend up to an hour installing a new operating system such as Windows NT from Microsoft. Throw in the additional time required for installing third party applications and utilities program further increase the total amount of time. In an attempt to reduce the length of time for installing software, manufacturers and suppliers offer businesses and consumers the convenience of "configure-to-order" where software and certain peripherals are bundled and preloaded at factory before it is shipped to end users.

Although configure to order (CTO) systems cut down significantly the possible delay the end user experiences when using his computer especially when it comes to the operating system, he nevertheless has to manually install third party software including applications and utilities and others. The end user's initial encounter with his new computer defines and colors his overall perception of the user friendliness of the computer. Hitherto, the end user of a new computer has to manually install third party software. As part of the general licensing obligations, the end user inputs his personal identification, product information and also work piece number before the application is installed. Some applications requires the end user to restart the computer before the application can be used. Most often, problems with installation of third party software occur at this juncture. Worse yet, the installation procedure of all the other software including operating system may have to be repeated. The manufacturer and suppliers of computer system has to devote considerable resource to handle such software issues when the end user encounters difficulties in installing and using third party software. 24 hours hot line, backup diskettes or similar recorded media and other after sales overhead are generally required to ease the end user beyond this initial stage of using his computer.

It is desirable to launch automatically the installation of third party software program of a new computer system. Furthermore, it is helpful to permit the end user interaction to comply with licensing requirement of third party software programs while launching the installation of such program transparently. Finally, it is ideal to allow a computer system to reboot after the installation of a third party software before proceeding automatically to the next installation.

SUMMARY OF THE INVENTION

The present invention is a system and method for facilitating the installation of third party software programs according to the user's preferred configuration. While it permits the normal user inputs such as keying in of personal information and license keys, it masks the actual installation process and reactivates automatically the next installation once previous one is completed. Not only does it allow the user to configure the system of his choice, but it permits the manufacturer to customize the configuration effectively on a mass production and product to order system.

BRIEF DESCRIPTION OF THE DRAWINGS

FIG. 3A is the generic content of an initialization file designed to work with third party software of the present invention.

FIG. 3B is the content of an embodiment of the present invention before it launches itself.

FIG. 3C is the content of an embodiment of the present invention after it launches itself.

DESCRIPTION OF THE EMBODIMENT OF THE INVENTION

Figure 1:
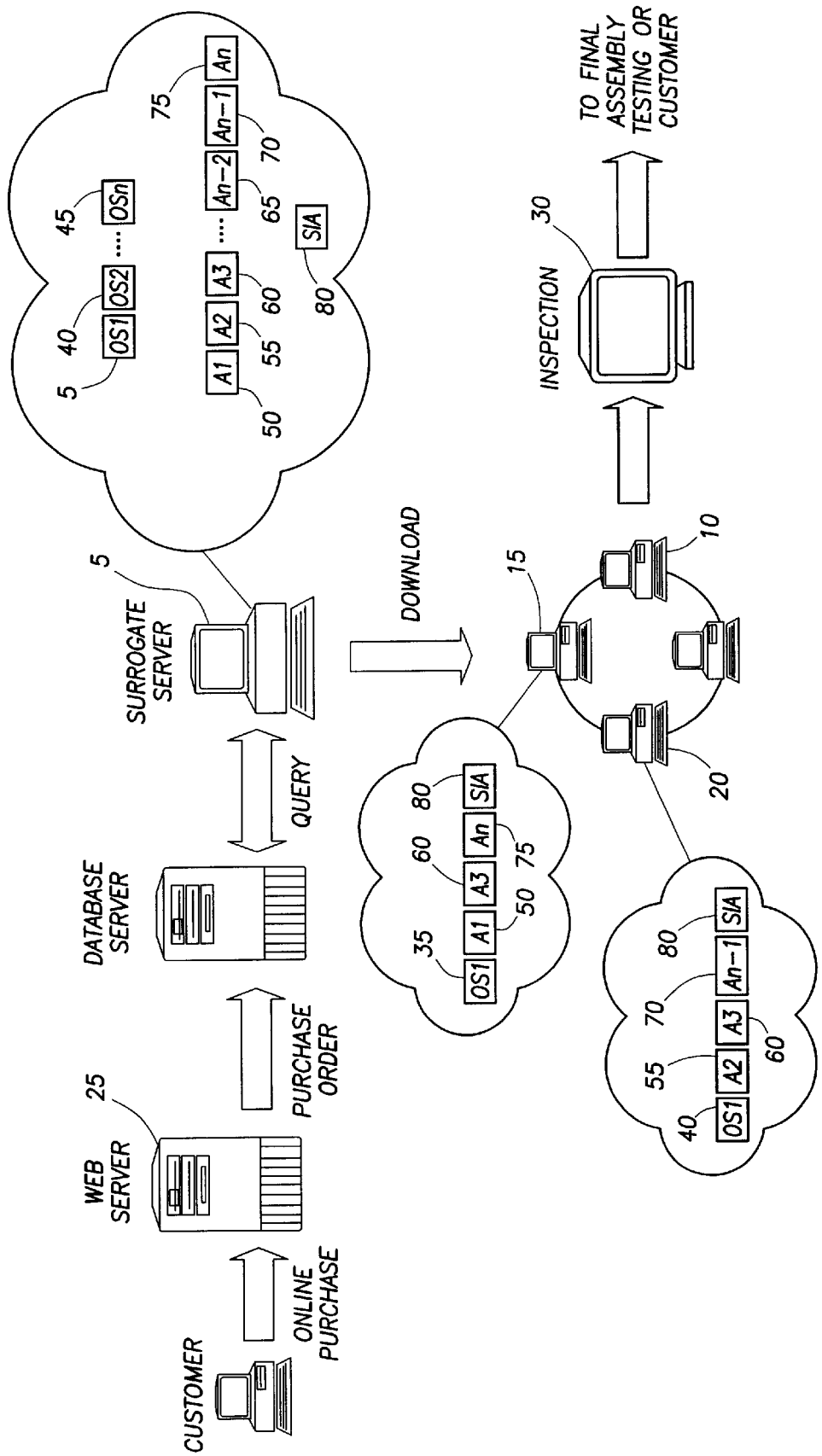
FIG. 1 is a graphical illustration of a configure to order (CTO) environment of which the present invention is well adopted to implement the installation of third party software.

A system and method for identifying and installing third party software automatically in a computer environment are described. In the following description, numerous specific details are set forth such as program steps in order to provide a thorough understanding of the present invention. It will be obvious to one skilled in the art that the present invention may be practiced without these specific details. In other instances, well-known steps such as those involved with installing an operating system or a third party software are not shown in order not to obscure the present invention.

Notation and Nomenclature

The detailed description with respect to the search for a configure to order file as well as creation of an initialization log file are presented partially in terms of algorithm and symbolic representation upon operation on data bits within the computer memory. These algorithmic descriptions and representations are the means used by those skilled in the art in the data processing arts to most effectively convey the substance of their work to others skilled in the art.

An algorithm is here, and generally, conceived to be a self-consistent sequence of steps leading to a desired result. These steps are those require physical manipulation of physical quantities. Usually, though not necessarily, these quantities take the form of electrical or magnetic signals capable of being stored, transferred, combined, and otherwise manipulated. In this case, the physical quantities are voltage signals which correspond to the installation sequence of a program. It proves convenient at times, principally for reason of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Further, the manipulations performed are often referred to in terms such as adding or comparing, which are commonly associated with the mental operations performed by a human operator. No such capability of a human operator is necessary, or desirable. In most cases, in any of the operations described herein which form part of the present invention; the operations are machine operations. Useful machines for performing the operations of the present invention include general purpose digital computers or similar devices such as digital signal processors. In all cases, it should be borne in mind that there is a distinction between the method operation in operating a computer and the method of computation itself. The present invention relates to method steps for operating a computer in installing programs to control the hardware and software thereof.

The present invention also relates to a system for performing these operations. This apparatus may be specially constructed for the required purpose or it may comprise a general purpose computer as selectively activated or reconfigured by a computer program stores in the computer. The algorithms presented herein are not inherently related to any particular computer or other apparatus. In particular, various general purpose machines may be used with programs written in accordance with the teachings herein, or it may prove more convenient to construct specialized apparatus such as digital signal processor to perform the required method steps. The required structure for a variety of these machines would appear from the description given below.

DETAILED DESCRIPTION OF THE PRESENT INVENTION

FIG. 1 is a graphical illustration of a configure to order environment of which the present invention is well adopted to implement the installation of third party software. The configure to order (CTO) environment 1 is a complex system for receiving and processing customer purchase information via known communication channels. It comprises in general at least a dashing facility 5, a plurality of computers 10, 15 and 20, at least one server 25 and at least one inspection facility 30. The dashing facility 5 comprises at least one depository for storing software such as a plurality of operating systems 35, 40 and 45 respectively and a plurality of third party software 50, 55, 60, 65, 70 and 75 respectively. The dashing facility 5 also has the ability to transfer authorized copies of the operating systems and third party software and the present invention onto the plurality of computers 10, 15, and 20 respectively. In the preferred embodiment of the present invention, the server 25 receives and records customer order information from known communications channels. These information are compiled as input to the dashing facility 5 which in turns downloads selected operating system and third party software onto computers 10, 15 and 20. It should be understood by one skilled in the art that computers 10, 15 and 20 are CPU which come with unrecorded storage media from suppliers. Through the dashing facility 5, each of the computers 10, 15 and 20 will be loaded with operating system and third party software according to customers' configuration.

Hitherto, each of the computers 10, 15 and 20 are merely loaded with selected operating system and third party software before it is inspected by the inspection facility 30.

When the customer receives the computer 20, he turns on the computer and installs each of the third party software 55, 60 and 70 manually. As mentioned in the background section above, the installation procedure can be time consuming and potentially fraught with delays.

Referring again to FIG. 1, the present invention is called software installation assistant SIA 80 and is used once during the installation of third party software. It is a program which is stored together with the depository of operating system and third party software as depicted in the dashing facility 5. When the configure to order is executed by the dashing facility, one copy of the SIA 80 is also loaded onto the computers 10, 15 and 20 respectively. The details of the structure and sequence of SIA 80 will be described below.

Figure 2:
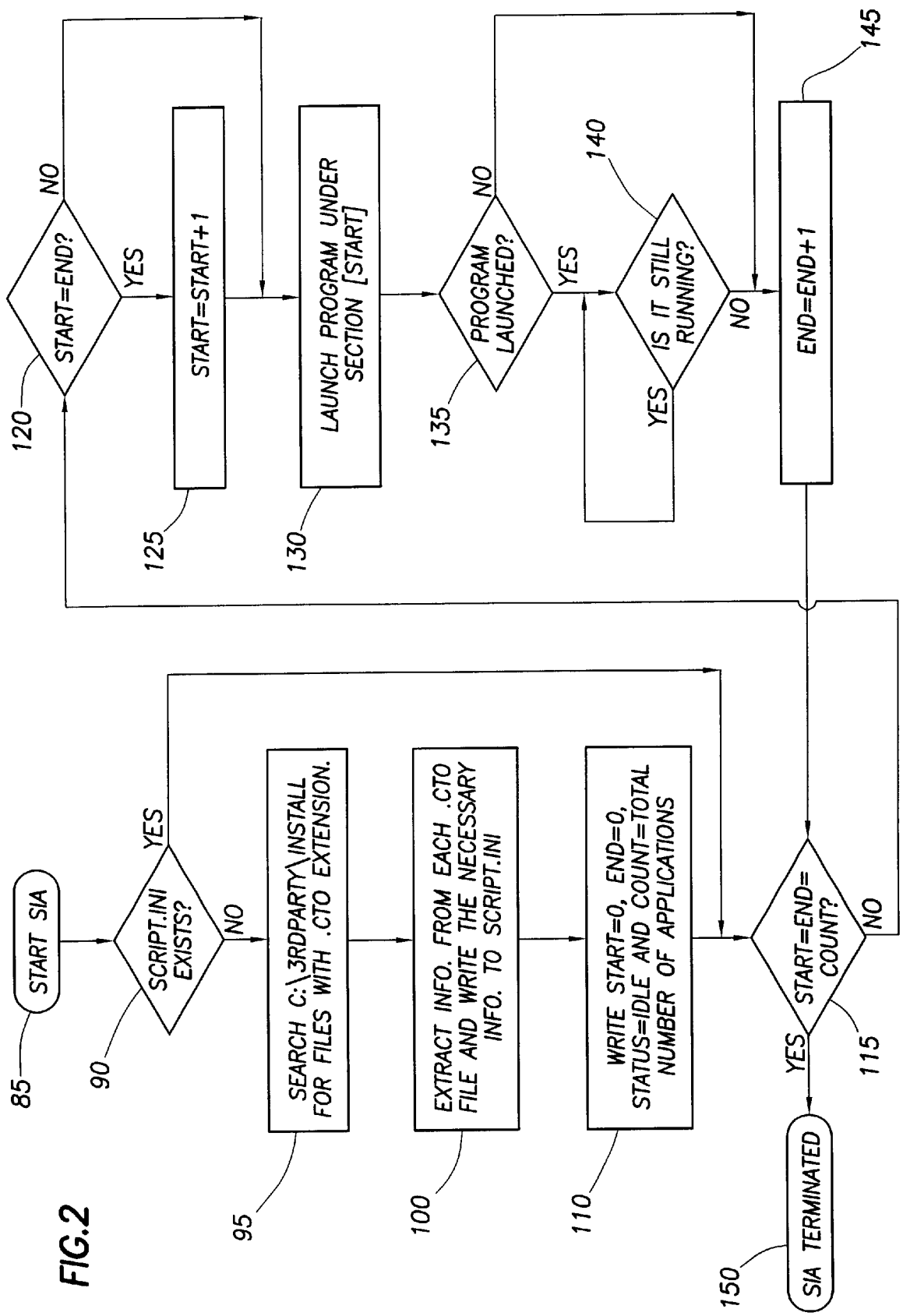
FIG. 2 is a logical flowchart showing the sequence of steps of the present invention.

FIG. 2 is a logical flowchart showing the sequence of steps implementing the present invention. Step 85 launches SIA 80 automatically whenever the installation of an operating system on a computer is completed. It should be understood by one skilled in the art that prior to this, the computer undergoes a power on self test (POST) before the preloaded operating system wakes up the computer hardware and interacts with the BIOS. An operating system launches the present invention 80 by looking up a database of installation configuration information. In the preferred embodiment of the present invention, disposed within the Windows NT registry is a subkeynamed HKEY_LOCAL_MACHINE\SOFTWARE\Microsoft\WindowsNT\Current\Version\Runonce whose value has been set "SIA"= "c:\system.sav\SIA.EXE". This executable file is inserted between the installation of the operating system and the installation of any third party software.

Referring to FIG. 2 and in step 90, the present invention queries whether any .ini script file exists. .ini files are plain text files that contain configuration information and are used by Windows and Window-based applications to save information about the preferences and operating environment. A typical .ini file is illustrated in FIG. 3A which begins with a section name in bracket followed by zero or more entries. For further reference, refer to Microsoft's Windows Resource Kit. It should be understood by one skilled in the art that the present invention is neither limited to ini.script file or the Windows operation system. On the contrary, the present invention is applicable to any suitable initialization file and any general operating system.

Again in FIG. 2 and in step 90 if no ini.script exists it means that the present invention has not been set up. It then proceed to steps 95, 100 and 110 where the search and extraction of the appropriate third party software occur. In step 95 and in the preferred embodiment of the present invention, the present invention scans for files terminating with configure to order (CTO) extension. CTO environment has been briefly explained in the background section above. Files terminating with CTO extensions are files which stores the configuration of an individual software. The CTO file extension scan provides the clue for the present invention to identify automatically and intelligently those files which are ordered by and preloaded for the end user under the CTO environment as illustrated graphically in FIG. 1. These CTO extension files are also those which requires end user to install after the operating system is installed. Upon the completion of the scan in step 95, the present invention extracts the contents from the CTO files and write the configuration information onto the .ini script file as illustrated in FIG. 3B. Next in step 110, the present invention initializes the .ini script file in FIG. 3B by setting start=0, end=0, status=idle and count=total number of third party software scanned. In the example illustrated by FIG. 3A to FIG. 3C, the count=1. It should be understood that under normal circumstances the end user orders more than one third party software.

For instance, in FIG. 1, the end users for computer 15 and 20 order three third party software each for their new computer. There, the count=3 in those cases.

Before step 115 continues, the present invention creates automatically and transparently to the end user an ini.script as depicted generically in FIG. 3B. As will be described further below, this .ini script file not only enables the end user to install third party normally but also able to resume after the rebooting of the system.

Step 115 in FIG. 2 queries if the value of start=end=count. If they are identical, then the present invention terminates itself in step 150 and the end user may use all the program on his computer. Otherwise, in steps 120 and 130 the present invention seeks out installation of third party software which require rebooting of the operating system after it is installed. Step 120 determines if the value of start=end. If they are not, it means that the installation requires rebooting after installation of the system. If not, in step 125, the value of start is incremented to signify that the installation may proceed to the next program. If the value of start is not equal to that of end, then the present invention proceeds to step 130 and the installation identified in the bracket as shown in FIG. 3A is launched or installed.

Step 135 checks if the installation is launched. If it is, then in step 140 the present invention queries whether the installation of third party software identified in bracket is still running. If it is, then the value of status will be set to running and the process loops to the beginning of step 140. If it is not, it means that the installation is completed. In step 145, the value of end is incremented by one and the present invention returns to step 115 to check if the value of start=end=count. In the example of FIG. 3C, where the count=1 and the third party software is identified as Quicken 98, the value of count=start=end=1 in step 145. Thus the present invention terminates itself in step 150. As the installation of the operating system as well as third party software is completed, the end user may use all the software without referring to the present invention.

While the present invention has been described particularly with reference to FIGS. 1 to 3C with emphasis on a method of installing software automatically in a computer environment, it should be understood that the figures are for illustration only and should not be taken a limitation on the invention. In addition, it is clear that the method and apparatus of the present invention has utility in many applications where software installation is required. It is contemplated that many changes and modifications may be made by one of ordinary skill in the art without departing from the spirit and the scope of the invention as described.

What we claim is:

1. A method for fulfilling an order for a personal computer (PC) that is preloaded with a functional operating system, said PC being configured to order (CTO) and delivered with requested software applications from third-party vendors, said software being loaded but not installed at the time of delivery, and said method comprising:

loading the files required to install the third-party software applications onto the PC; and loading configuration information onto the PC, said configuration information indicating third-party software applications to be installed;

generating an initialization file that indicates the status of the third-party software installation; and editing the initialization file to update the progress of the third-party software installation, wherein upon the first boot up of the PC after delivery, the configuration information is examined and each of the third-party software applications are sequentially installed and, if required, the PC is rebooted after each third-party software application is installed, and wherein if no initialization file exists when the computer is booted, examining the configuration information and creating the initialization file indicating the total number of third-party software applications to be installed and the sequence in which they are to be installed.

2. The method of claim 1 further comprising:

creating counters within the initialization file indicating whether the installation of each of the third-party software applications has started and finished.

3. The method of claim 2 further comprising:

detecting from the counters whether the installation of a third-party software application is complete and, if not complete, waiting until the installation is complete and, if required, rebooting the computer before initiating installation of a subsequent third-party software application.

4. The method of claim 3 further comprising:

counting the number of third-party software application installations that have started using a start counter; and counting the number of third-party software application installations that have ended using an end counter.

5. The method of claim 4 further comprising:

installing the third-party software applications under the control of a software installation assistant that is executed after the operating system loads.

6. The method of claim 5 further comprising:

terminating the software installation assistant when the values contained within the start and end counters equal the total number of third-party software applications.

7. A method for installing configured to order (CTO) software applications onto a computer system comprising:

loading any installation files required to install the software applications onto the PC;

loading a configuration file onto the PC for each software application to be installed;

reading the configuration file for each software application;

compiling an installation list of software applications identified by the configuration files; and placing the installation list in an initialization file that further comprises counters for tracking the progress of the software application installations, wherein the configuration files are read and the initialization file is generated upon the first boot of the computer system by the end user, wherein said configuration file indicates the name of the software application to be installed and the location of the installation files associated with that software, and wherein said method permits the installation of the software applications sequentially and automatically while permitting the user to input personal information and license information and further allowing the system to reboot between software application installs.

8. The method of claim 7 wherein the counters comprise a start counter that indicates which software application in the installation list is currently being installed and an end counter that indicates which software application in the installation list has been most recently installed.

9. The method of claim 8 further comprising:

terminating installation process when the start counter and the end counter equal the number of software applications in the installation list.

10. The method of claim 9 further comprising:

inhibiting the installation of a next software application in the installation list until the start counter and the end counter contain the same number.

11. The method of claim 10 further comprising:

permitting the reboot of the computer system after the installation of a software application prior to advancing the end counter.

12. The method of claim 11 wherein the installation files required to install the software applications are in the form of self-extracting, executable installation programs.

* * * * *